United States Patent [19]

Karlsson et al.

[11] 4,320,304

[45] Mar. 16, 1982

[54] APPARATUS FOR INCREASING THE FLOW SPEED OF A MEDIUM AND FOR RECOVERING ITS KINETIC ENERGY

[75] Inventors: Jan Karlsson, Gothenburg; Gert Raimel, Asa Station, both of Sweden

[73] Assignee: New Environment Energy Development Aktiebolag (NEED), Gothenburg, Sweden

[21] Appl. No.: 6,121

[22] Filed: Jan. 24, 1979

[30] Foreign Application Priority Data

Jan. 30, 1978 [SE] Sweden .............................. 7801112
Jan. 10, 1979 [SE] Sweden .............................. 7900241

[51] Int. Cl.³ .................. F03D 9/00; H02P 9/04; F03D 7/00; F02K 3/00
[52] U.S. Cl. ............................... 290/55; 290/44; 60/269; 415/2 A
[58] Field of Search ............... 290/1 R, 43, 44, 54, 290/55; 415/2 A, 116, 119, DIG. 1; 60/269; 416/85

[56] References Cited

FOREIGN PATENT DOCUMENTS 729534 12/1942 Fed. Rep. of Germany ..... 415/2 A
891697 3/1944 France .............................. 415/2 A Primary Examiner—J. V. Truhe
Assistant Examiner—John B. Conklin
Attorney, Agent, or Firm—Haseltine and Lake

[57] ABSTRACT

Apparatus for increasing the flow speed of a medium such as air and for recovering its kinetic energy, comprising a series of concentrical, substantially symmetrically arranged annular members separated by annular slots, said members in the direction towards length axis of the apparatus, which coincides with the flow direction of the medium, having successively and substantially symmetrically decreasing dimensions in the direction of said length axis to the formation of an inlet opening wherein said annular members have curved leading edges with intermediary annular slots for removal of turbulent medium, and to the formation of an outlet opening acting as a diffuser for the medium, wherein said annular members are successively thinner to the formation of sharp edges directed outwards from the length axis of the apparatus; the kinetic energy of the medium being recovered by conventional means. Separate accelerator means are also provided.

2 Claims, 8 Drawing Figures

APPARATUS FOR INCREASING THE FLOW SPEED OF A MEDIUM AND FOR RECOVERING ITS KINETIC ENERGY

The present invention relates broadly to apparatus for increasing the flow speed of a medium such as air or water and for recovering its kinetic energy. The invention is described below with reference to wind as the medium but it will be appreciated that the invention with modifications which are well-known and obvious is applicable also to a medium such as water.

Increase of the flow speed of air, i.e. wind, will enable a far better recovery of wind energy since the recoverable kinetic energy is proportional to the third power of the wind speed. Thus, doubling the air speed will increase the recoverable kinetic wind energy eight times. Further, it is generally accepted that it is not economically feasible to recover wind energy at wind speeds below about 5 meters per second. Since the average wind speed in most places of the world is estimated to be 5-7 m/s there are long periods of time when no energy at all can be recovered from the wind. Accordingly, it is the purpose of the invention to develop improved means for increasing the wind speed and thus increase the kinetic energy recoverable in a wind turbine.

The simplest device for recovering wind energy is a propeller or turbine mounted on a stand, usually provided with means for automatically turning the propeller into the wind, said propeller or turbine driving e.g. an electric generator. Relatively high wind speeds are required for economical conversion of wind energy to other forms and accordingly, this type of device has serious limitations.

Attempts have been made to increase the overall efficiency of the above-mentioned propeller device. One of the more promising suggestions is to provide the propeller with a shroud in the form of a tube which on the lee side of the propeller increases conically at a certain angle. The cone-shape will diffuse the air behind the propeller and decrease the static pressure which will result in an increased air-flow through the device and increased efficiency. Said cone is usually referred to as a diffuser. It has been found in practice that the maximum diffuser angle is about 7°. Angles above 7° will tend to decease the diffusing effect and thus also the overall efficiency of the device.

Further, attempts have been made to increase the wind speed by "concentrating" it in cone-shaped devices under the presumption that a restriction of the passage-way would increase the air speed. However, such attempts have been unsuccessful since the wind gets turbulent and turbulence is equal to loss of energy. A device for increasing the wind speed by concentrating the area of a passage-way will in the present context be called an accelerator.

It is a purpose of the present invention to achieve effective novel accelerator means for use in connection with wind-driven propellers or turbines.

It is a further purpose of the invention to achieve effective novel accelerator diffuser combinations wherein the diffuser angle can be considerably increased which gives an increased overall efficiency of the apparatus.

The invention is described in detail with reference to the accompanying drawings, wherein FIGS. 1-5 show diagrammatically different embodiments of an accelerator according to the invention. All of them are essentially tubular and have circular cross-sections. Sections along the longitudinal axis are shown. The flow direction of the wind is indicated by arrows.

In all of the drawings the same or corresponding parts are indicated by the same figures. As mentioned above all of the devices shown are essentially tubular and have all circular cross-sections (not shown).

An accelerator according to the invention comprises several parts or sections, the diameter of which decreases stepwise in the flow direction of the wind. The accelerators shown in FIGS. 1, 2 and 3 comprise four sections, viz. 1-4, whereas the accelerator of FIG. 4 comprises six sections 1-6 and the accelerator of FIG. 5 comprises three sections 1-3. The sections are coaxial and the front parts thereof are smoothly curved so that the air is brought to accelerate along the surfaces towards the subsequent section. Said curved surfaces are indicated by 7-9 in FIGS. 1, 2 and 3 and 7-12 in FIG. 4. It is obvious that narrowing of the air passageway will cause a corresponding increase of air speed. However, it is unavoidable that a certain amount of harmful turbulence is formed before each section and such turbulent air is let out through annular slots 13-17 located at the beginning of each curved surface 7-12 and an essentially laminar flow is maintained along the whole accelerator. The air passing through the slots can either be let out to the surrounding atmosphere or assembled in connecting ducts and let out through an annular slot, 18 in FIG. 4. This arrangement will cause a suction of turbulent air into the annular slots due to suction caused by high speed air flowing out of the accelerator.

The dimensions of the annular slots depend on the size of the accelerator and the optimal sizes can be determined by routine experiments.

The propeller or the turbine (not shown) shall, of course, be located in the exit part of the accelerator, i.e. its narrowest cross-section.

Figure 1:
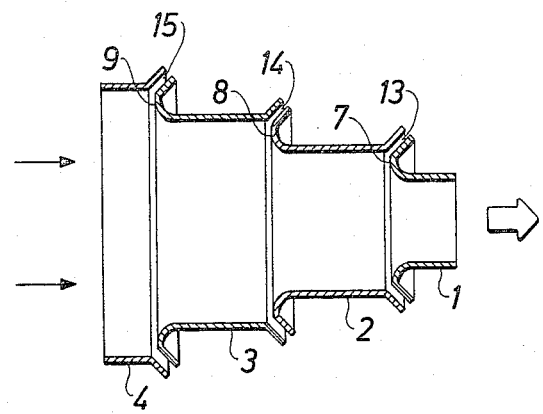
Figure 2:
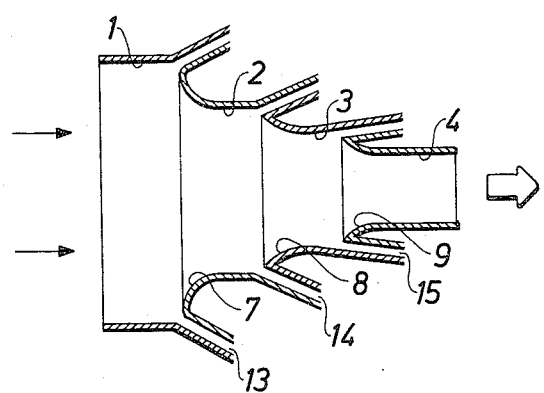
Figure 3:
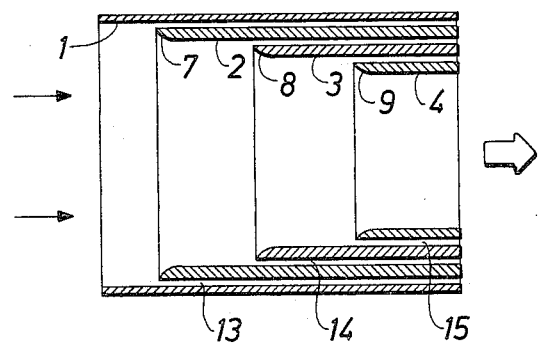
Figure 4:
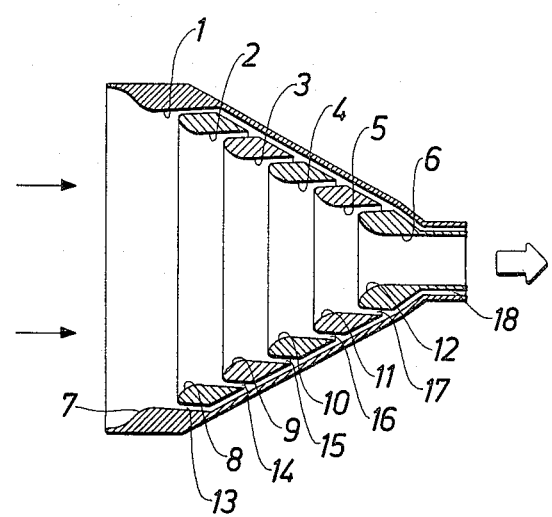

Experiments with the accelerator embodiments shown in FIGS. 1 and 3 have shown that it is not at all important to have some distance between each diameter-decreasing step, i.e. for each section to have a certain length for stabilization of the air flow. It has been found that the length of each section should be kept as short as possible, e.g. as is shown in the embodiment of FIG. 2. (Even very short section lengths give a useful effect). This embodiment also shows the possibility to increase the radius of the curved entry to each subsequent section for improving the aerodynamic characteristics of the accelerator, i.e. to flatten out the curvature with increasing wind speed.

Figure 5:
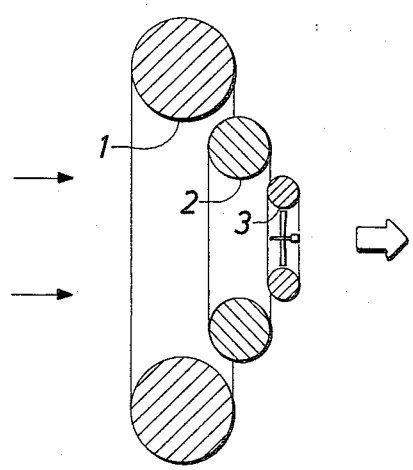

FIG. 5 shows an extreme embodiment of an accelerator consisting of three ring members with circular ring cross-sections, the rings decreasing in diameter in the wind direction and the propeller being located centrally in the smallest ring. The spaces between the rings form the annular slots present in the embodiments discussed above.

Figure 8:
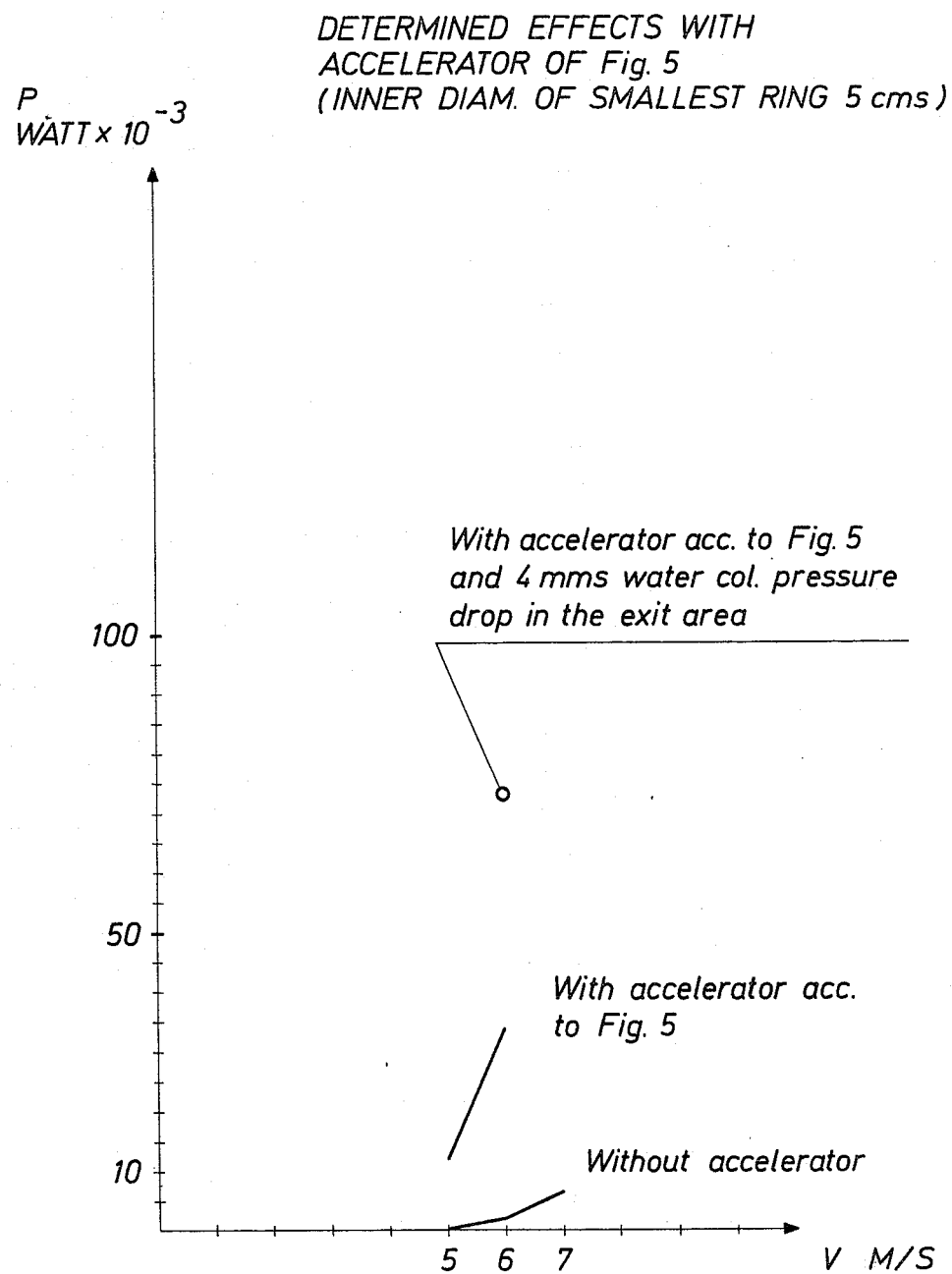
FIG. 8 is a diagram containing data obtained in experiments with the accelerator of FIG. 5.

FIG. 8 is a diagram containing data from practical experiments with this embodiment. It will be seen that a test propeller (diameter 5 cms.) gives practically no effect at a wind speed of 5 m/s without the accelerator. With accelerator fitted and at the same wind speed $10 \times 10^{-3}$ watt were obtained from a generator driven by the propeller. An increase of the wind speed to 6 m/s did still not give any effect without the accelerator but an increased effect of $34 \times 10^{-3}$ watt with the accelerator fitted.

The effect and importance of a diffuser have been discussed above. To simulate the effect of a diffuser a small partial vacuum of 4 mms. of water column was used in the same series of experiments. The effect of this small vacuum behind the propeller increased the effect obtained from the generator driven by the propeller to $73 \times 10^{-3}$ watts.

A pilot accelerator in principle according to FIG. 1 was used in practical tests. The inlet area of the device was 174 cm$^2$ with two subsequent sections with areas of 65 and 20 cm$^2$ resp. Turbulent air was let off through annular slots. At a natural wind speed of 5 m/s a speed of about 40 m/s was obtained in the exit end of the accelerator corresponding to a calculated propeller effect of about 40 W.

An important embodiment according to the present invention is a combination of an accelerator of the type described above and a diffuser of a modified design. A diffuser is, as explained above, a device which gives the air passing through a propeller as great an expansion volume as possible. In order to improve the effect of the diffuser use is made of the air passing through the annular slots in the accelerator, which air has a higher energy then the surrounding air. When passed into the diffuser as described below this air will cause a relatively large wake with a lower pressure than the surrounding air. With an unshrouded propeller a small wake is formed behind the propeller. When a conventional diffuser is fitted to a propeller said wake is somewhat improved. In practice it has been found that the maximum diffuser angle for diffusers of conventional design is about 7°. At greater angles the air flow does not follow the diffuser wall and this will result in a drastic decrease of the effect of the propeller. According to the invention the diffuser angle can be considerably increased.

Figure 6:
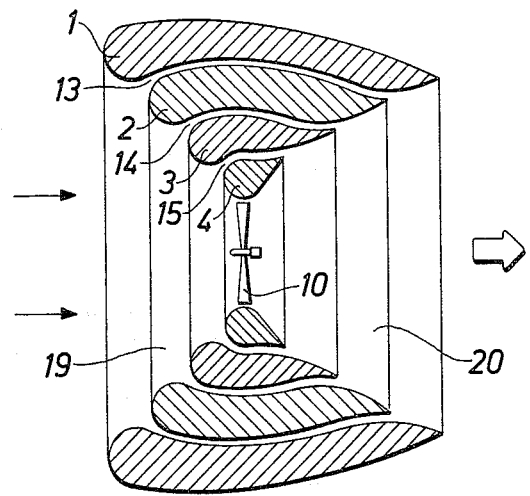
FIG. 6 shows also diagrammatically a similar lengthwise central section of a combination of an accelerator, designed with the use of the same principle as for the accelerator embodiments shown in the preceding Figs., and diffuser.

The device shown in FIG. 6 consists in principle of an accelerator of the type described above in combination with a modified diffuser. It consists of a series of annular sections 1-4, arranged symmetrically and with increasing diameters and separated from each other by annular slots 13-15. Sections 1-4 have in the direction towards the longitudinal axis of the device, which axis coincides with the flow direction of the wind, successively and essentially symmetrically decreasing dimensions in the direction of length axis of the device to the formation of an essentially conical inlet opening 19, wherein the annular sections have aerodynamically rounded front edges separated by annular slots for removal of turbulent air from the inlet opening, and to the formation of an outlet opening 20, acting as a diffuser for the air, wherein the annular sections are successively thinner to the formation of aerodynamically advantageous sharp edges directed outwards from the length axis, which edges lead the air flowing through the annular slots along the diffuser surface. The kinetic energy of the air flowing with increased speed through the central part of the device is recovered with the use of one or more propellers or turbines of conventional design, which turbine can operate an electrical generator G.

The embodiment according to FIG. 6 is thus essentially a unique combination of a specific accelerator and a specific diffuser. The inlet opening turned towards the wind is designed with rounded edges on the annular sections and the slots between the sections lead away the turbulent air which unavoidably is formed at the beginning of each section when the air is accelerated and due to friction. The air speed is thus increased successively during its passage through the accelerator part and the speed increase corresponds roughly to the area decrease.

The diffuser end is essentially cone-shaped and its function is to cause expansion of the air after having passed the propeller. The turbulent air separated into the slots in the accelerator part has, in spite of its turbulence, higher energy than the surrounding air and this air is passed through the slots to the diffuser part, where it is directed to an angle outwards from the center axis which will increase the size of the wake behind the propeller which gives the air passing through the propeller area a substantially increased expansion space.

The air flowing through the device will leave it with a rotating movement caused by the propeller. An increased effect in the diffuser can be obtained by giving the air passing through the annular slots a movement rotating in the same direction as the main flow, such as by arranging guiding baffles (not shown) in the slots. The net result will be an increased diffuser action due to the tromb effect achieved.

Figure 7:
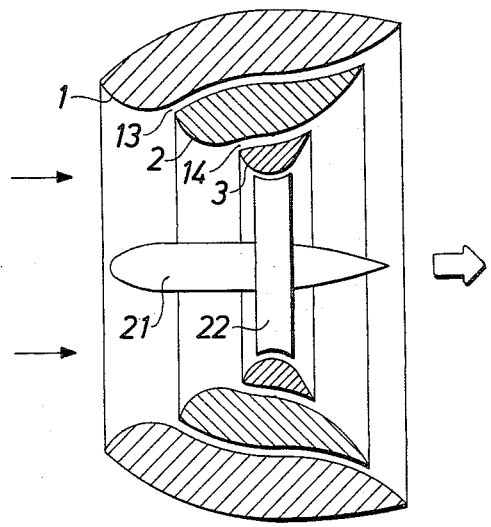
FIG. 7 shows, similar to FIG. 6, a modified combination of an accelerator and a diffuser, in this case provided with a central body.

FIG. 7 shows a modification of the device of FIG. 6. An aerodynamically formed central body 21 has been inserted in the center of the device, extending essentially over the whole length of the device. The hub of the propeller 22 can form a part of this central body which ends in a point in the diffuser exit. An advantage of this design is that it enables a more efficient energy recovery due to the presence of the central body in the propeller hub area.

The accelerator-diffuser device according to FIG. 6 has been tested and compared with an unshrouded propeller of exactly the same form and size. The propeller diameter was 19 cms. and the pitch 6 cms. In the table below the rotational speeds of the propellers are stated.

TABLE

| Wind speed | R.p.m. |
|---|---|
| I. Unshrouded propeller | |
| 3-4 m/s | 0-1000 |
| 5 m/s | 2600 |
| II. Propeller fitted with the device of FIG. 6 | |
| 3-4 m/s | 3400 |
| 5 m/s | 4900 |

The experimental results above indicate that the device of FIG. 6 at 3-4 m/s increases the propeller rotations per minute three to four times. This means that the device makes it possible to utilize wind speeds as low as 3 m/s for energy recovery. At a wind speed of 5 m/s the propeller speed is doubled. Since the recoverable kinetic energy is proportional to the third power of the wind speed this means that the device enables an 8-fold increase of recoverable kinetic energy.

We claim:

1. Apparatus for increasing the flow speed of a medium, such as air, and for recovering its kinetic energy, the apparatus comprising:

a series of annular members arranged symmetrically and separated by annular slots, said members being located coaxially with the longitudinal axis of the apparatus, which axis coincides with the flow direction of the medium, each of said members having an aerodynamically curved annular leading edge facing the flow of the medium and a tapered end in the opposite direction pointing essentially outwards from said longitudinal axis, the combined curved annular leading edges of the members defining an essentially conical inlet opening acting as a flow speed accelerator for the medium, said inlet opening having a decreasing cross-sectional area in the flow direction of the medium and the combined tapered ends of the members defining an essentially conical outlet opening for the medium acting as a divergently directing diffuser for the medium, said outlet opening having an increasing cross-sectional area in the flow direction of the medium;

and wherein the kinetic energy of the medium flowing through the apparatus is recovered by conventional means, such as one or more turbines for driving an electric generator, said means being located coaxially with the center axis of the apparatus in the center thereof.

2. Apparatus according to claim 1 wherein the number of the annular members is in the range of 3 to 5.

* * * * *